United States Patent [19]

Taga et al.

[11] Patent Number: 5,589,969
[45] Date of Patent: Dec. 31, 1996

[54] WAVELENGTH DIVISION MULTIPLEXED OPTICAL FIBER TRANSMISSION EQUIPMENT

[75] Inventors: Hidenori Taga, Saitama; Noboru Edagawa, Tokyo; Noriyuki Takeda; Shu Yamamoto, both of Saitama-ken; Shigeyuki Akiba, Tokyo, all of Japan

[73] Assignee: Kokusai Denshin Denwa Kabushiki Kaisha, Tokyo, Japan

[21] Appl. No.: 542,058

[22] Filed: Oct. 12, 1995

[30] Foreign Application Priority Data

Mar. 15, 1995 [JP] Japan ................................. 7-083429

[51] Int. Cl.$^6$ ............................................. H04J 14/02
[52] U.S. Cl. ........................... 359/124; 359/133; 359/122; 359/156
[58] Field of Search ................................. 359/124, 133, 359/122, 156, 161; 370/6, 19, 70, 121

[56] References Cited

U.S. PATENT DOCUMENTS 5,305,134  4/1994  Tsushima et al. .................. 359/133

FOREIGN PATENT DOCUMENTS 2281670  3/1995  United Kingdom ................. 359/124

OTHER PUBLICATIONS

"Reduction of Four–Wave Mixing Crosstalk in WDM Systems Using Unequally Spaced Channels'", *IEEE Photonics Technology Letters*, vol. 6, No. 6, Jun. 1994, pp. 754–756 by F. Forghieri et al.

"Electronics Letters", vol. 24, No. 24, Nov. 24, 1988, pp. 1528–1529 by N. Shibata et al.

*Primary Examiner*—Wellington Chin
*Assistant Examiner*—Kinfe-Michael Negash
*Attorney, Agent, or Firm*—Westman, Champlin & Kelly, P.A.

[57] ABSTRACT

The present invention provides a wavelength division multiplexed optical fiber transmission equipment which can increase the number of channels of the WDM signal by reducing a required bandwidth of optical signals while suppressing an interference between signals caused by four-wave mixing. A WDM optical transmitting terminal comprises five or more optical transmitters and the wavelengths of optical signals from the optical transmitters are set such that the spacing between the wavelengths of two signals is re-used as the spacing between the wavelengths of other two signals separated by the above signals by two or more waves and there is no periodicity in the channel spacing s. For instance, the wavelengths of the optical signals are set as shown in FIG. 1. As the result, deterioration in the transmission characteristics of the optical signals can be effectively reduced and, at the same time, the maximum number of channels of the WDM signal can be increased. To the WDM optical transmitting terminal is added polarization state controllers for controlling the state of polarization such that the states of polarizations of adjacent signals cross each other at an output of the WDM optical transmitting terminal.

5 Claims, 6 Drawing Sheets

1 – 8 ARE TRANSMITTERS

11 – 18 ARE RECEIVERS

1 - 8 ARE TRANSMITTERS

11 - 18 ARE RECEIVERS

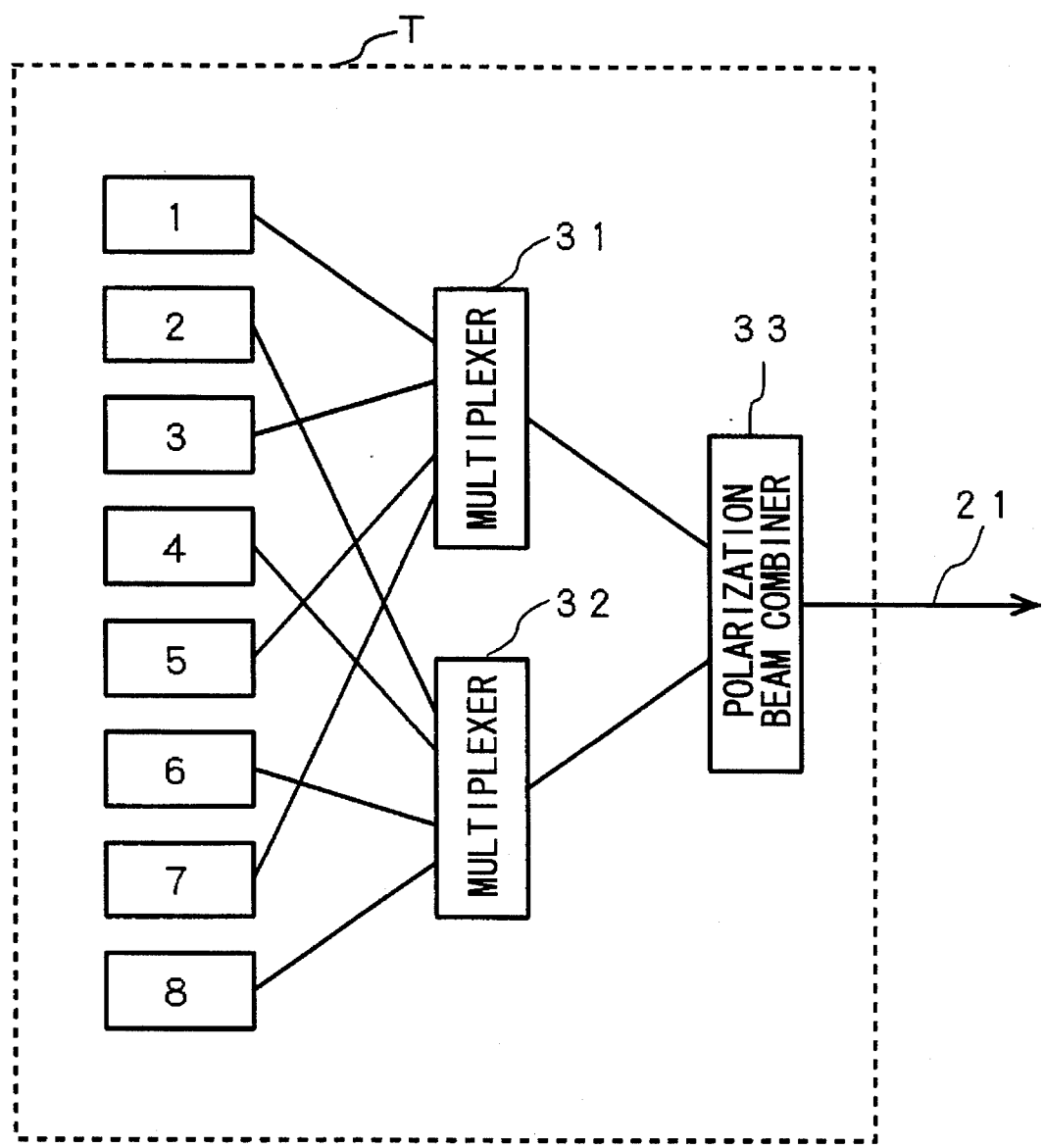

1 - 8 ARE TRANSMITTERS
41 - 48 ARE POLARIZATION STATE CONTROLLERS 5,589,969

1

WAVELENGTH DIVISION MULTIPLEXED OPTICAL FIBER TRANSMISSION EQUIPMENT

BACKGROUND OF THE INVENTION

1. Field of the Invention

This invention relates to a wavelength division multiplexed optical fiber transmission equipment. More particularly, it relates to a wavelength division multiplexed optical fiber transmission equipment which is capable of increasing the transmission capacity of an optical fiber transmission system by suppressing interference between codes caused by four-wave mixing.

2. Description of the Related Art

Since an optical fiber transmission system which makes use of a wavelength division multiplexed signal (to be abbreviated as WDM signal hereinafter) can increase the transmission capacity of a transmission line without making modifications on the transmission channel, its technology is expected to be applied in a future optical fiber transmission system for trunk lines. When a WDM signal is used, if four-wave mixing between signal wavelengths is existent, four-wave mixing generated from two signal lights adjacent to a signal light causes an inter-symbol interference in the case of equal spacings between signal wavelengths. Thereby, the characteristics of the system such as the maximum transmission distance and the maximum number of channels of the WDM signal are limited. As a technology for preventing deterioration in characteristics caused by this four-wave mixing, there is known one in which the spacing between arbitrary two wavelengths is made unequal (F. Forghieri et al., IEEE Photon. Technol. Lett. vol. 6, no. 6, pp. 754–756).

An example of the technology is described with reference to FIG. 10. FIG. 10 shows the wavelengths of signal lights allocated to respective eight channels as the axis of abscissas. As evident from the figure, the channel spacing between first and second channels is 0.8 nm, the channel spacing between second and third channels is 0.9 nm, the channel spacing between third and fourth channels is 1.2 nm, and so on. In this way, the spacing between arbitrary two chanells is made unequal to the spacing between any other two channels.

By making the spacings unequal, it is possible to effectively suppress an inter-symbol interference caused by four-wave mixing generated by signal lights adjacent to another signal light.

However, when the spacings between respective two wavelengths are made unequal, a required bandwidth of an optical signal becomes wider than when the spacings between respective two wavelengths are equal. As the result, the number of wavelengths able to be multiplexed is reduced. The reason for this is as follows. Since the minimum channel spacing of a WDM signal is limited by the performance of an optical de-multiplexer used for the separation of the WDM signal as a matter of course, when x represents the minimum channel spacing, a bandwidth nx is sufficient for a system in which an n number of wavelengths are multiplexed with equal spacings while a bandwidth for multiplexing an n number of wavelengths is much larger than nx in a system with unequal spacings in which the spacings between respective two wavelengths must be set larger than x.

In an example of the system shown in FIG. 10, since the minimum channel spacing x is 0.7 nm, when the spacings between respective two wavelengths are made equal, the bandwidth of optical signals for channels 1 to 8 is 4.9 nm. In contrast to this, when the spacings between arbitrary two wavelengths are made unequal, the bandwidth needs to be 7 nm, about 1.4 times wider than when the spacings between respective two wavelengths are made equal as understood from the figure.

Apart from a technology for making unequal the spacings between signal wavelengths, there is known a technology for intentionally arranging adjacent optical signals such that the states of polarizations of these signals cross each other, making use of the fact that the generation efficiency of four-wave mixing is high when the states of polarizations of optical signals associated with the generation of four-wave mixing match with each other and low when the states cross each other.

However, this technology is unsatisfactory as a technology for suppressing generation of four-wave mixing when it is applied in a long-distance wavelength division multiplexed transmission system because the states of polarizations of adjacent signals cannot be maintained due to birefringence of an optical fiber after the signals are transmitted through some distance. Furthermore, when the states of polarizations of adjacent optical signals are caused to cross each other, the states of polarizations of signal wavelengths with one wavelength interposed therebetween match each other. As the result, the generation efficiency of four-wave mixing is increased.

SUMMARY OF THE INVENTION

It is therefore an object of the present invention to provide a wavelength division multiplexed optical fiber transmission system which can eliminate the above problems of the prior art, suppress an inter-symbol interference caused by four-wave mixing, and increase the number of wavelengths able to be multiplexed while reducing a required bandwidth of optical signals.

To attain the above object, the present invention is characterized in that a wavelength division multiplexed optical fiber transmission equipment for transmitting a plurality of signals having different wavelengths by multiplexing wavelengths comprises a WDM optical transmitting terminal including 5 or more optical transmitters for outputting signals wherein the spacing between the wavelengths of two signals is re-used as the spacing between the wavelengths of two other signals separated from the above signals by two or more waves and there is no periodicity in the channel spacing s.

Further, the present invention is also characterized in that the WDM optical transmitting terminal comprises polarization state control means for controlling the state of polarization such that the states of polarizations of adjacent signal wavelengths cross each other at an output end of the WDM optical transmitting terminal.

The generation efficiency of four-wave mixing is in proportion to the light intensify of each signal associated with the generation of four-wave mixing and in inverse proportion to the spacing between the wavelengths of signals (Reference Document: N. Shibata et al., Electronics Letters, vol. 24, pp. 1528–1529, 1988). Roughly speaking, when the channel spacing is two times larger, the generation efficiency of four-wave mixing becomes ¼. Therefore, expansion of the channel spacing is effective for suppressing the generation of four-wave mixing. In a wavelength division multiplexed optical fiber transmission system in which optical signals having five or more wavelengths are multiplexed, when the spacing between the wavelengths of two signals is re-used as the spacing between the wavelengths of two other signals separated from the above signals by two or more waves, four-wave mixing caused by the existence of two same channel spacings can be suppressed by a large channel spacing obtained by separating other optical signals by two or more waves. Therefore, deterioration in the transmission characteristics of optical signals can be effectively reduced. Further, since the bandwidth of the WDM signal can be reduced by re-use of the spacing between wavelengths, the maximum number of channels of the WDM signal can be increased.

When the states of polarizations of adjacent optical signals are caused to cross each other at an output end of the WDM optical transmitting terminal, generation of four-wave mixing between adjacent optical signals can be suppressed for up to several hundred kilometers of a transmission optical fiber adjacent to the transmitting terminal, thereby making further improvement on the system.

BRIEF DESCRIPTION OF THE DRAWING

FIG. 4 is a block diagram of the configuration of a WDM optical transmitting terminal according to a second embodiment of the present invention;

DETAILED DESCRIPTION OF THE PREFERRED EMBODIMENT

Figure 2:
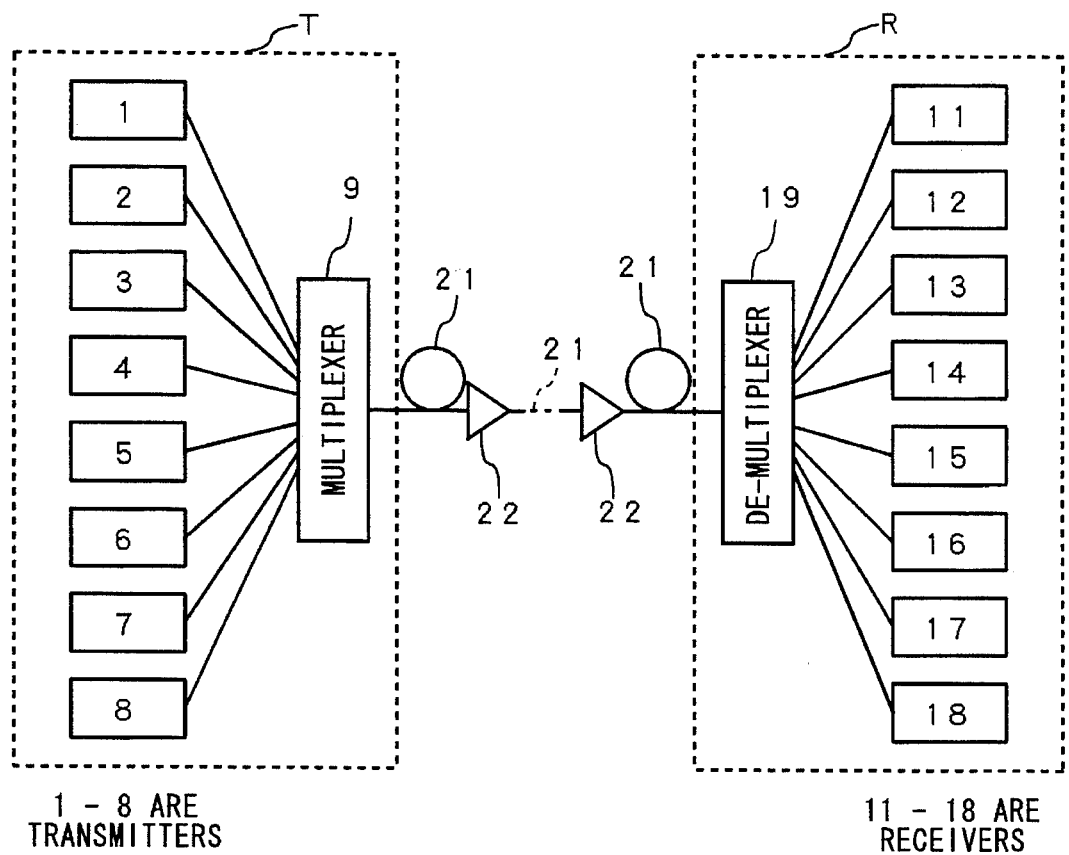
FIG. 2 is a block diagram of the system configuration of the first embodiment of the present invention.

The present invention is described in detail hereinunder with reference to the accompanying drawings. The configuration of a first embodiment of the present invention is first described with reference to FIG. 2.

The WDM optical transmitting terminal T is composed of optical transmitter 1 to 8 for channels 1 to 8 and a multiplexer 9. Meanwhile, a WDM optical receiving terminal R is composed of optical receivers 11 to 18 for channels 1 to 8 and a de-multiplexer 19. Although eight optical transmitter and eight optical receivers are provided in this embodiment, the present invention is not limited to this. Any terminal which includes five or more optical transmitters or receivers is acceptable. The WDM optical transmitting terminal T and the WDM optical receiving terminal R are interconnected by a transmission optical fiber 21 into which optical amplifiers 22 are inserted at a predetermined interval.

Figure 3:
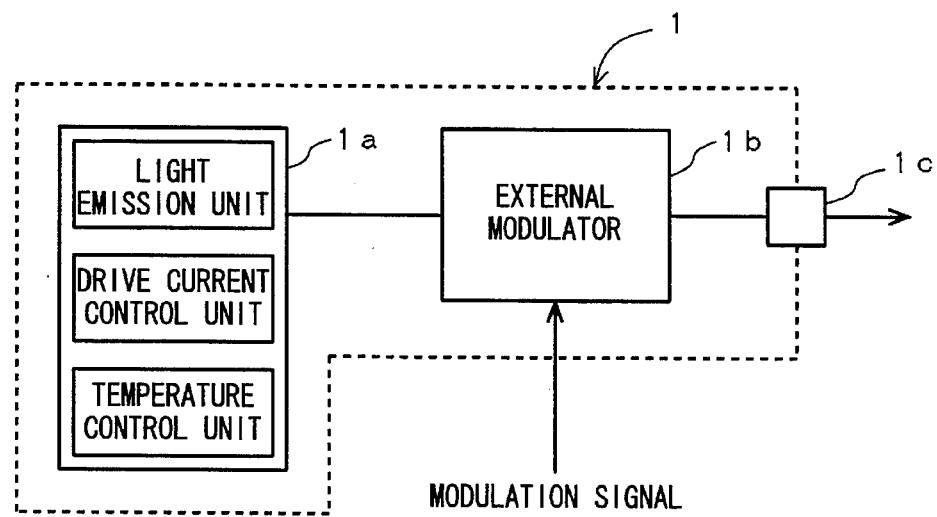
FIG. 3 is a block diagram of the configuration of an optical transmitter of the first embodiment.

FIG. 3 is a block diagram of an exemplary optical transmitter 1. The optical transmitter 1 is composed of a light source 1a, an external modulator 1b, and an output terminal 1c. The light source 1a is composed of a light emission unit, a drive current control unit, and a temperature control unit. An electric current and temperature for driving the light emission unit are stabilized at a high accuracy by the drive current control unit and the temperature control unit. For instance, drive current is stabilized at 10 µA and temperature at 0.01° C. The optical transmitters 2 to 8 are composed likewise.

Figure 1:
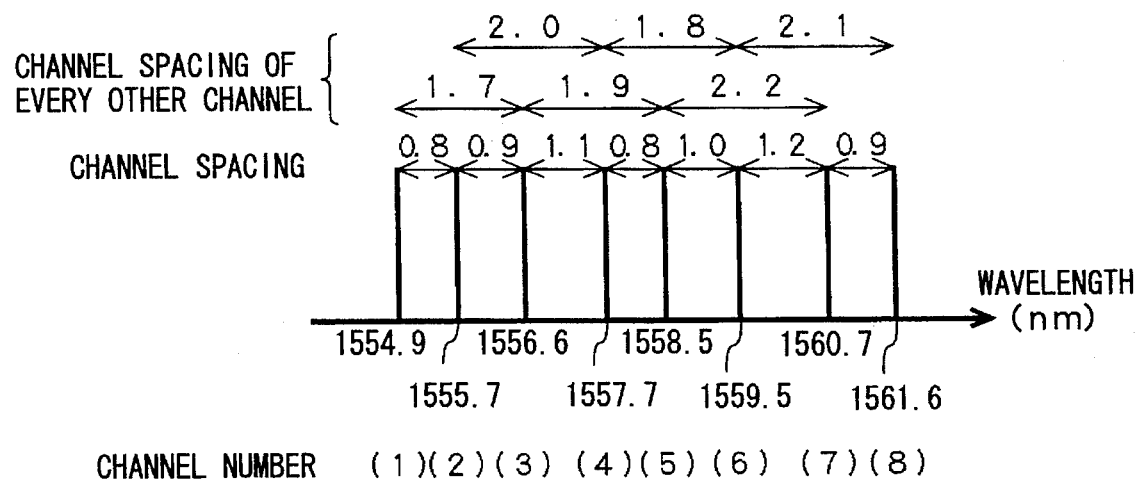
FIG. 1 is a diagram showing an exemplary combination of signals to be multiplexed according to a first embodiment of the present invention.

According to this embodiment of the present invention, for wavelengths of signal lights output from the optical transmitter 1 to 8, the spacing between the wavelengths of two signals is re-used as the spacing between the wavelengths of other two signals separated from the above signals by two or more waves and it is determined that there is no periodicity in the wavelength spacings. For instance, the channel spacing is determined such as shown in FIG. 1. That is, the wavelengths of signal lights output from the optical transmitters 1 to 8 (channels 1 to 8) are determined to be 1554.9, 1555.7, 1556.6, 1557.7, 1558.5, 1559.5, 1560.7 and 1561.6 nm, respectively.

As evident from FIG. 1, the spacing between channels 1 and 2 and the spacing between channels 4 and 5 which are separated from channel 2 by two channels are set to 0.8 nm. Also, the spacing between channels 2 and 3 and the spacings between channels 7 and 8 separated from channel 3 by four channels are set to 0.9 nm. There is no periodicity in the spacing between channels.

Signal lights having respective wavelengths from the optical transmitters 1 to 8 (see FIG. 2) are combined by the multiplexer 9 and the combined light is transmitted over the optical fiber 21 to the WDM optical receiving terminal R. The signal light is transmitted while it is attenuated in the transmission optical fiber 21 and amplified by the optical amplifiers 22 repeatedly. When the WDM optical receiving terminal R receives the signal light, the signal light is divided by the de-multiplexer 19 and the divided signal lights are transmitted to the optical receivers 11 to 18.

Figure 10:
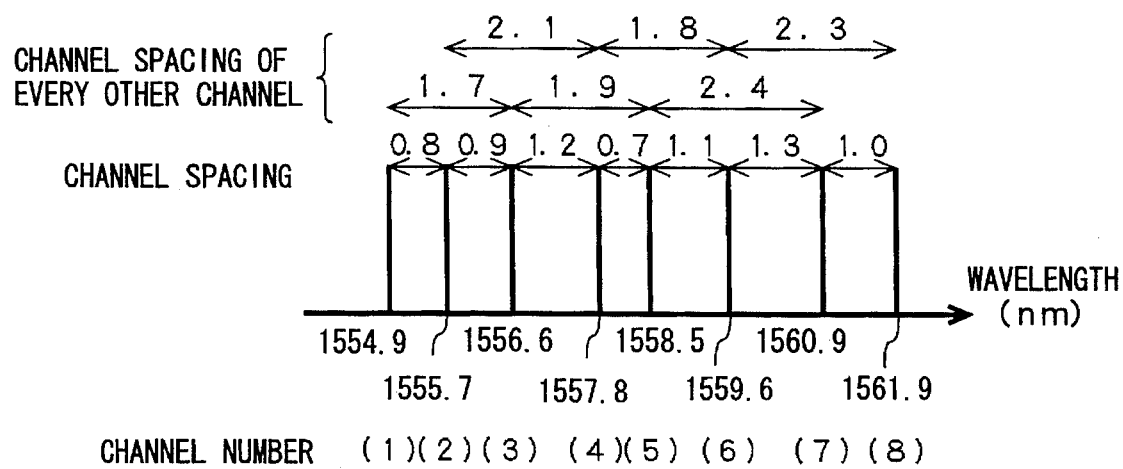
FIG. 10 is a diagram showing an exemplary combination of signals to be multiplexed of the prior art.

According to this embodiment of the present invention, the wavelengths of signal lights from the optical transmitters 1 to 8 are set as shown in FIG. 1 and four-wave mixing caused by the existence of two equal channel spacing s can be suppressed by a large channel spacing obtained by separating other light signals by two or more waves. Therefore, deterioration in the transmission characteristics of optical signals can be reduced effectively. As evident from comparison between FIG. 10 and FIG. 1, the bandwidth of optical signals for channels 1 to 8 of this embodiment is 6.7 nm (from 1561.6 to 1554.9) which is narrower than 7 nm of FIG. 10. As the result, it is possible to use effectively the amplifying bandwidth of the optical amplifier 22. In other words, the maximum number of channels of the WDM signal can be increased.

Figure 5:
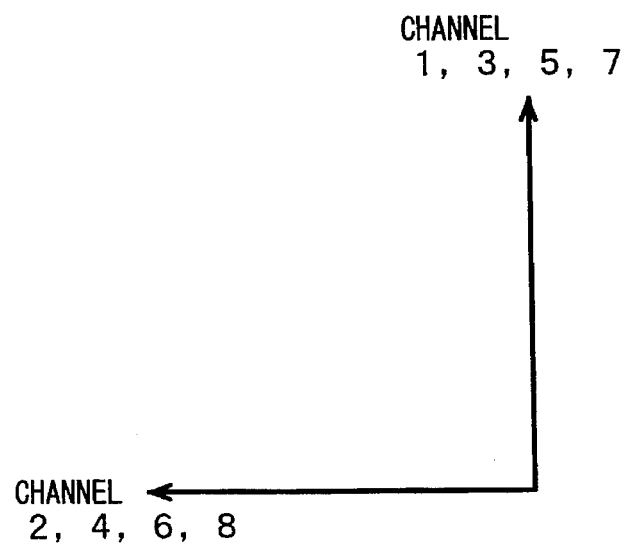
FIG. 5 is a diagram explaining the states of polarizations of optical signals obtained in the second embodiment.

A description is subsequently given of a second embodiment of the present invention. FIG. 4 shows the configuration of the WDM optical transmitting terminal T of this embodiment. Since other elements are the same or equivalent as those of FIG. 2, they are not shown. A multiplexer 31 for odd numbered channels combines signal lights from optical transmitters 1, 3, 5 and 7 for channels 1, 3, 5 and 7. A multiplexer 32 for even numbered channels combines signal lights from optical transmitters 2, 4, 6 and 8 for channels 2, 4, 6 and 8. The combination of the states of polarizations of signal lights for channels obtained by a polarization beam combiner 33 is shown in FIG. 5. That is, the states of polarizations of signal lights for odd numbered channels and the states of polarizations of signal lights for even numbered channels cross each other.

A description is subsequently given of the operation of this embodiment. The wavelengths of signal lights from the optical transmitters 1 to 8 for channels 1 to 8 are such as in the first embodiment that the spacing between the wavelengths of two signals is re-used as the spacing between the wavelengths of two other signals separated from the above signals by two or more waves and it is determined that there is no periodicity in the channel spacing s. Signal lights from the optical transmitter 1, 3, 5 and 7 for odd numbered channels are combined by the multiplexer 31 while signal lights from the optical transmitters 2, 4, 6 and 8 for even numbered channels are combined by the multiplexer 32. The combined signal lights are transmitted to the polarization beam combiner 33 which causes the states of polarizations of odd numbered channels and the states of polarizations of even numbered channels to cross each other for output to the transmission optical fiber 21. As the result, the states of polarizations of adjacent channels cross each other at the transmitting terminal.

Generally speaking, four-wave mixing does not occur between signal lights whose state of polarization is cross each other. Therefore, according to this embodiment, four-wave mixing generated between adjacent channels can be suppressed. When the signal wavelength of each channel is determined as shown in FIG. 1, four-wave mixing generated between even numbered channels and between odd numbered channels which are the same in the state of polarization does not cause interference to other channels. Therefore, the effect of four-wave mixing generated every other channel can be suppressed.

In contrast to this, in the prior art system in which the spacings between wavelengths to be multiplexed are made equal (see FIG. 6), four-wave mixing generated between odd numbered channels and between even numbered channels which are the same in the state of polarization causes interference to other channels, resulting in deterioration in characteristics. The distance at which crossing between the states of polarizations of signals is maintained is determined by the size of birefringence of the transmission optical fiber and the spacing between wavelengths to be multiplexed.

Figure 6:
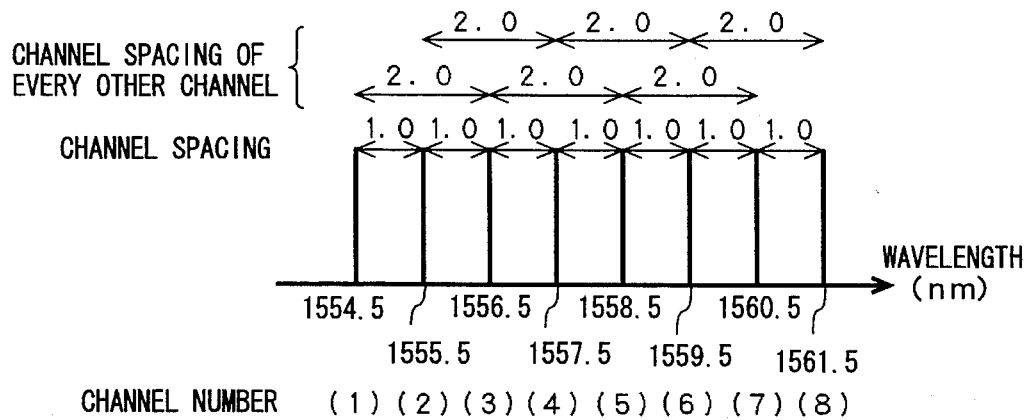
FIG. 6 is a diagram showing an exemplary combination of signals to be multiplexed of the prior art.

Experiments have been actually conducted with a combination of signal wavelengths shown in FIG. 1 and equal spacings between wavelengths shown in FIG. 6 to verify the effect of this embodiment. 66 km of the transmission optical fiber was used in each section and 15 optical amplifiers were used to construct a 1,000 km long experimental transmission line. Since the optical bandwidth which can set the wavelength of each signal is limited by a reduction in the bandwidth caused by multi-relay by means of optical amplifiers, the maximum bandwidth is about 9 nm in this embodiment, resulting in combinations of signal wavelengths as shown in FIG. 1 and FIG. 6.

Figure 7:
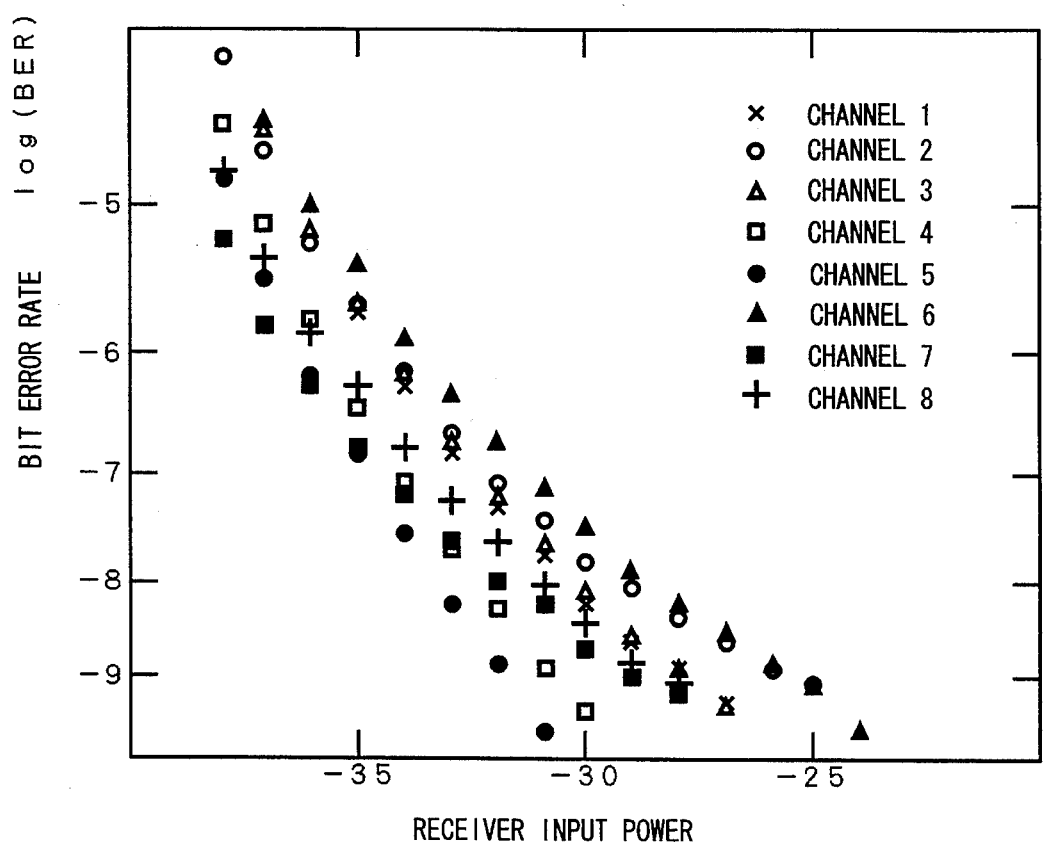
FIG. 7 is a diagram of measured bit error rate characteristic of each channel for explaining the results of experiments based on the second embodiment.

When a combination of signals as shown in FIG. 6 was used, even if sufficient input power, i.e., −15 dBm, was provided to the optical receivers, only a bit error rate of $10^{-6}$ could be attained for a channel showing the best characteristics after transmission to a distance of 1,000 km. In contrast to this, when a combination of signals as shown in FIG. 1 was used, a digital error rate characteristic as shown in FIG. 7 was obtained. As understood from this figure, a good bit error rate of $10^{-9}$ or less was attained for all the channels after transmission to a distance of 1,000 km with a relatively weak input power for optical receivers of −30 to −25 dBm. Thus it was verified that the effect of the embodiment is remarkable.

Figure 8:
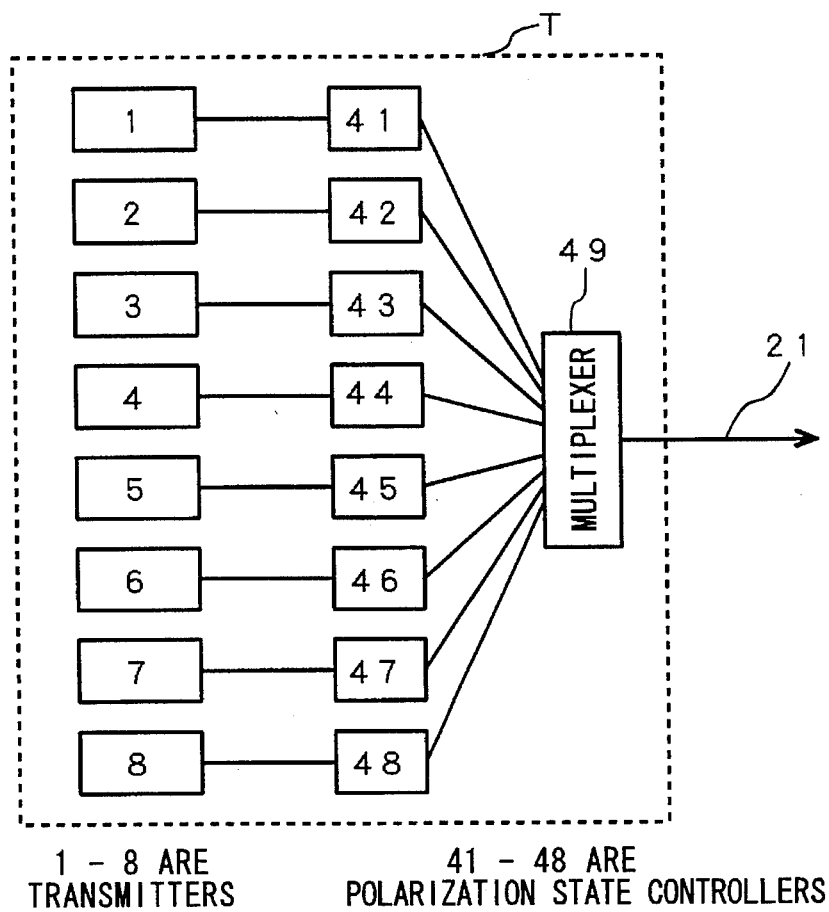
FIG. 8 is a block diagram of the configuration of a WDM optical transmitting terminal according to the third embodiment of the present invention.

A description is subsequently given of a third embodiment of the invention. FIG. 8 shows the configuration of a WDM optical transmitting terminal T of this embodiment. The WDM optical transmitting terminal T is composed of optical transmitters 1 to 8 for channels 1 to 8, polarization state controllers 41 to 48 for channels 1 to 8, and a multiplexer 49. The polarization state controllers 41 to 48 make settings so that, when any two signal wavelengths are selected from channels 1 to 8, the states of polarizations of the two signals do not match each other.

Figure 9:
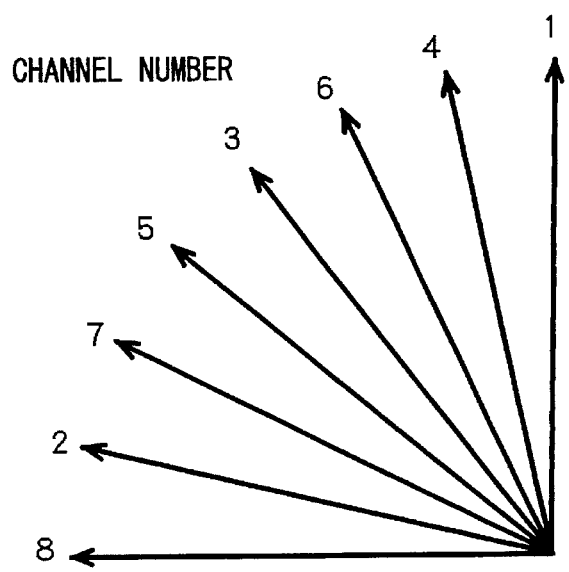
FIG. 9 is a diagram explaining the states of polarizations of optical signals obtained in the third embodiment.

FIG. 9 shows an exemplary combination of the states of polarizations of channels of this embodiment. In the case of the combination of the states of polarizations of signals as shown in FIG. 9, unlike the second embodiment, four-wave mixing is generated between the wavelengths of any signals. However, according to this embodiment, the four-wave mixing is not so large as four-wave mixing generated between odd numbered channel and between even numbered channels in the second embodiment. Therefore, the characteristics are equalized for all the channels and the characteristics of the entire system are improved.

As is obvious from the above description, according to the present invention, a plurality of optical transmitters output signals in which the spacing between wavelengths of two signals is re-used as the spacing between the wavelengths of other two signals separated from the above signals by two or more waves and there is no periodicity in the channel spacing s. Therefore, deterioration in the transmission characteristics of optical signals can be reduced effectively and the maximum number of channels of the WDM signal can be increased.

In addition, when the states of polarizations of adjacent optical signals are caused to cross each other at an output end of the WDM optical transmitting terminal, generation of four-wave mixing between adjacent optical signals can be suppressed for up to several hundred kilometers of a transmission optical fiber adjacent to the transmitting terminal, thereby further improving the transmission characteristics of an optical fiber transmission system.

Since a plurality of optical transmitters control the state of polarization such that, even when any two waves having different wavelengths are taken out, the states of polarizations of the two signals do not match each other at an output end of the WDM optical transmitting terminal, the transmission characteristics of all the channels are equalized and as the result, the transmission characteristics of the entire optical fiber transmission system can be improved.

What is claimed is:

1. A wavelength division multiplexed optical fiber transmission equipment for transmitting a plurality of signals having different wavelengths by multiplexing the wavelengths, the equipment comprising a WDM optical transmitting terminal including five or more optical transmitters for outputting signals wherein the spacing between the wavelengths of two first signals is re-used as the spacing between the wavelengths of two other signals separated from said first signals by two or more signal wavelengths and there is no periodicity in channel spacings.

2. A wavelength division multiplexed optical fiber transmission equipment according to claim 1, wherein said WDM optical transmitting terminal comprises polarization state control means for controlling the state of polarization such that the states of polarizations of adjacent signals cross each other at an output end of said WDM optical transmitting terminal.

3. A wavelength division multiplexed optical fiber transmission equipment according to claim 2, wherein said polarization state control means comprises a first multiplexer for combining signals from optical transmitters for odd numbered channels of the WDM optical transmitting terminal, a second multiplexer for combining signals from even numbered channels of the WDM optical transmitting terminal, and a polarization beam combiner for controlling the state of polarization such that the states of polarizations of signals from said first and second multiplexers cross each other.

4. A wavelength division multiplexed optical fiber transmission equipment according to claim 1, wherein said WDM optical transmitting terminal comprises polarization state control means for controlling the state of polarization such that, when any two waves having wavelengths are selected, the states of polarizations of the two signals do not match each other at an output end of said WDM optical transmitting terminal.

5. A wavelength division multiplexed optical fiber transmission equipment according to claim 4, wherein said polarization state control means comprises a plurality of polarization state control units for polarizing signals from optical transmitters for respective channels at a predetermined angle and a multiplexer for combining signals from the plurality of polarization state control units.

* * * * *